Nov. 2, 1926.

S. LEE

SLIDE RULE

Filed April 13, 1925   2 Sheets-Sheet 1

1,605,355

INVENTOR
SMITH LEE
BY
ATTORNEY

Nov. 2, 1926.

S. LEE

SLIDE RULE

Filed April 13, 1925  2 Sheets-Sheet 2

1,605,355

INVENTOR
SMITH LEE
ATTORNEY

Patented Nov. 2, 1926.

1,605,355

UNITED STATES PATENT OFFICE.

SMITH LEE, OF LOS ANGELES, CALIFORNIA.

SLIDE RULE.

Application filed April 13, 1925. Serial No. 22,634.

The special slide rule constituting my present invention is designed especially to facilitate computations involving periodic payments upon a principal sum upon which interest is payable at a stated rate, the respective payments being applied first to the payment of interest accrued to the date of payment and then in the reduction of the principal.

Problems of the mentioned sort are of constant occurence not only in banking and real estate transactions, and the like, but in connection with building contracts and sales of merchandise; and the incidental computations are so tedious that extensive tables have been prepared and are in current use, to aid in their solution; but volumes containing these tables are relatively bulky and expensive and their data are not only limited in character but liable to misconstruction by those unfamiliar with their use. It is accordingly an object of this invention to provide a slide rule comprising a "fixed" body bearing logarithmic scales, a "slide" bearing graphs, and a "runner",—some or all of these elements being especially designed and equipped to facilitate the solution of problems involving periodic payments which include interest; and a preferred embodiment of my invention, as applied to problems involving (1) a principal sum, (2) a rate of interest, and (3) a number of monthly or other periodic payments and (4) the uniform sum periodically paid, may comprise means for the finding of any one of the four mentioned items when the other three are known.

Other objects of my invention will appear from the following description of alternative simple embodiments thereof, taken in connection with the appended claims and the accompanying drawings, in which Fig. 1 may be regarded as a diagrammatic plan view illustrating my invention as applied to a straight slide rule of the Mannheim type,—the most essential novel feature thereof being a set of graphs, displayed on a movable slide and cooperating with longitudinal lines,—which may be provided on a transparent "runner."

Figure 1:
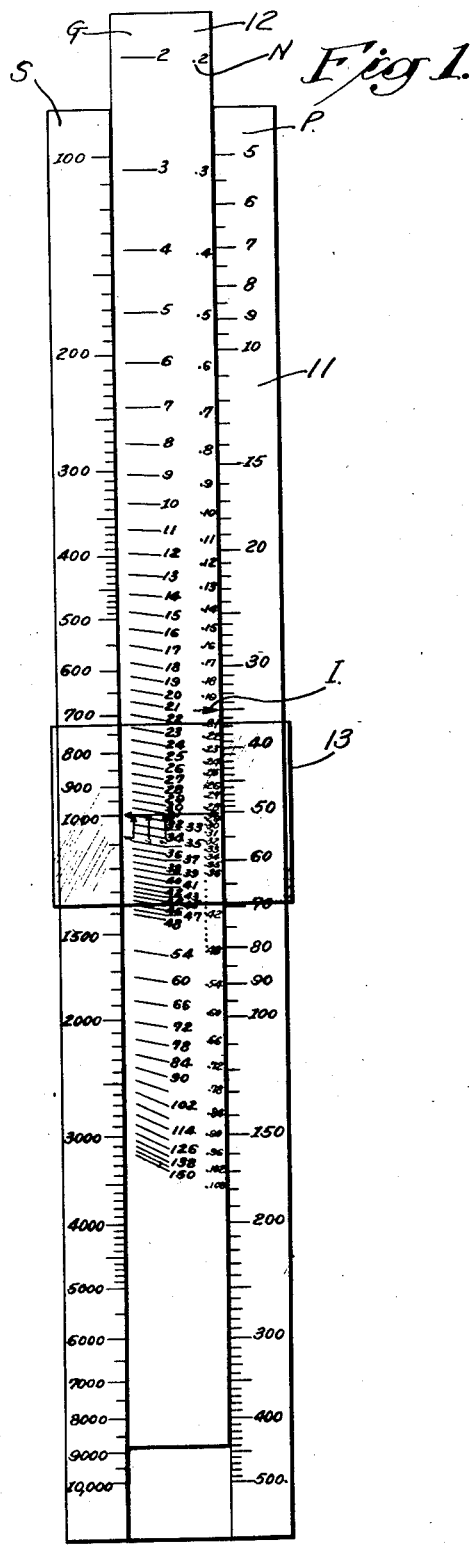
Figure 2:
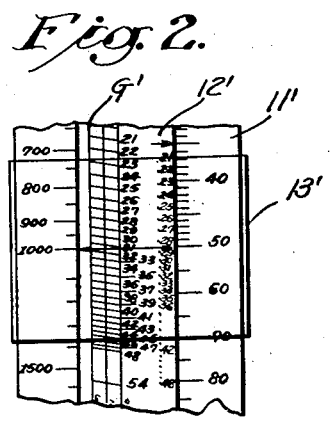
Fig. 2 illustrates a "rule" embodying the same general principles but provided with longitudinal lines directly on the slide thereof and intersecting the mentioned graphs.

The respective logarithmic scales shown on the fixed body 11 of the straight rule illustrated in Figs. 1 and 2 may be referred to respectively as a principal sum scale S and a monthly payment scale P; and these scales may resemble the corresponding fixed scales on an ordinary Mannheim slide rule, except as, with due regard to the intended use, the range and spread of the same may be kept within desirable limits; and the respective numberings may be as complete and consecutive as desired. For example, assuming that the principal sums to be considered may ordinarily range between the $100 and the $10,000, and that the monthly payments may range between $5 and $500, graduations and numerals may be distributed on a straight fixed body 11 in substantially the manner shown in Fig. 1 and a slide 12 may be provided with an indicating arrow or index point I, so positioned as to allow for any offset between the mentioned scales and to permit extensive movements of the slide in opposite directions.

In order to enable my slide rule to be used, if desired, for example, in the performance of ordinary multiplications and divisions, such as may be involved in computing monthly payments without interest, I may, in some cases, provide the slide 12 with a set of graduations or numbered dots N, or the like, arranged as a third logarithmic scale, the figures of this scale N being so positioned that, when the indicating arrow I is brought opposite a specific monthly payment number (as "40") and eye-aiding means such as the hair line of a runner 13 is brought into coincidence with a particular dot (as the dot numbered "60" in the scale N) it is possible to read directly on the scale S, by noting where the hair line of the runner 13 crosses the same, the corresponding principal sum (as $2400 in the case asumed); and, when the princpal sum and one of the mentioned factors are known, it will be obvious that the described means may be employed to find the other factor.

Graduations comparable with those mentioned and permitting exactly equivalent operations, among others, are of course commonly provided, although in a somewhat less specialized and convenient form, on an ordinary Mannheim slide rule; and the most essential novelty and merit of my rule may reside in certain features additional to those above mentioned and adapting the same to be used in computations which involve interest at some fixed rate, monthly payments to be applied partially in payment of such interest and partially in the reduction of the principal sum.

For the purpose last referred to, the time required to complete payment of a principal sum plus interest on varying balances being, when plotted upon logarithmic paper, a graph dependent upon the rate of interest, I may provide upon the slide 12, or its equivalent, a series of marks or graphs constructively originating in the logarithmic scale N, but consistently contracted (to a degree depending on interest rate) and shown as so inclined as to indicate the diminution in the number of payments required as the interest rate approaches zero. Unless complete graphs covering rates of interest from zero to, for example, a rate such as 8% are required, the ends of the graphs G need not extend to dots N; and, in Figs. 1 and 2 I have shown these graphs as relating only to rates of interest between 6% and 8% and as relating only to periodic payments not fewer than two nor more than 150; but it will be obvious that these limits may be extended or contracted as desired, and that the organization may be prepared on any preferred scale, enabling the same to be read with any desired degree of precision. The terminal points of the respective graphs shown in Figs. 1 and 2 being easily determinable by computation or by reference to printed tables. I will forego explanation, at this point, of my preferred procedure of laying the same out,—outlining my method only in connection with an alternative form hereinafter described, in which the graphs are provided on a circular disc.

In the use of such a slide rule as is above described, assuming, for example, that it is desired to ascertain the number of $35 monthly payments required to cover a principal sum of $1000 and interest thereon at 6%, or 7%, or 8%, the arrow indicator I may be set opposite that graduation on the scale P representing "35"; (as in Figs. 1 and 2) and, if the hair line of the runner or cursor 13 is then brought opposite the sum "$1000" in the principal sum scale S, the hair line will be found approximately to touch one end (the 6% end) of the "31" graph and also approximately to touch the other end (the 8% end), of the "32" graph. Either the slide 12 or runner 13, or both of these, may be provided with interest rate lines, as the lines 6, 7 and 8 of Fig. 1; and, by easy interpolation, it will be recognized that approximately 31½ months will be required, in the case assumed, to complete payment if the interest rate is 7%;—whereas about 31 months will be required, if the interest rate is 6%; and about 32 months, if the interest rate is 8%.

In Fig. 1, I show a runner 13 (movable relatively to a slide 12 mounted in a rule body 11), as provided with longitudinal lines with which the figures "6", "7" and "8" are respectively associated; but, as shown in Fig. 2, I may optionally provide a slide (as the slide 12', movable in the body 11') with parallel lines intersecting the inclined lines or graphs G' said parallel lines, in any event, extending longitudinally; and I may then omit the suggested longitudinal lines from the runner 13'; and it will be appreciated also that the relationships between the four quantities involved in the problem discussed above are such that, any three being known, the fourth may be found by a procedure of the general character set forth.

Figure 3:
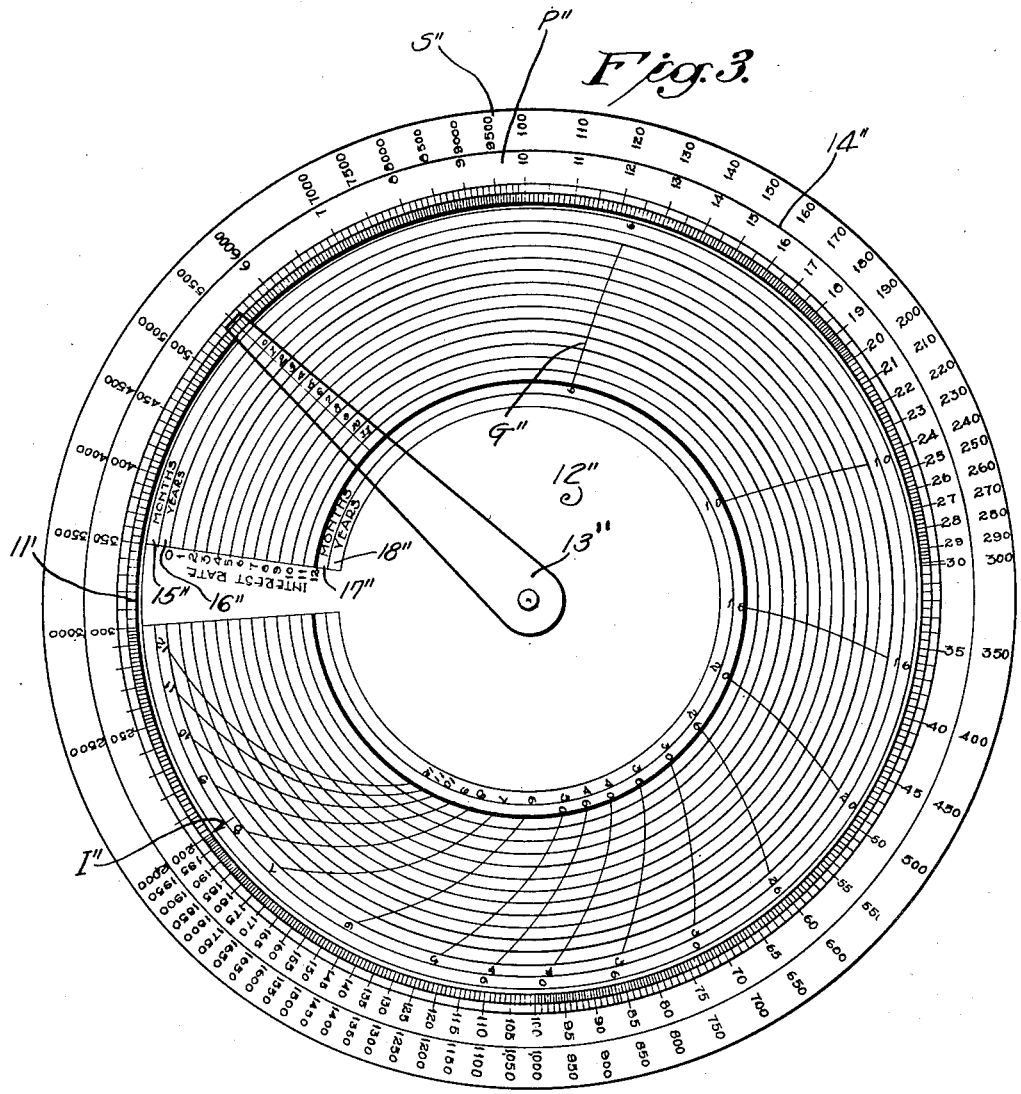
Fig. 3 is a plan view illustrating an important alternative form of my invention in which the "slide" is a rotor and the "runner" is a concentrically pivoted arm.

Circular slide rules being also in current use, I show in Fig. 3 how the principles of my invention may be applied to a rule of this latter type,—with advantages which may in some cases be of considerable practical importance. In this form, both a two-cycle principal-sum scale S'' (shown as "beginning" with the same number—100—as in the case of the illustrated straight rule) and a two-cycle monthly payment scale P'' may be disposed about the circumference of a circle upon a "fixed" body,—enabling a single set of graduations to be used for two purposes, if desired. I have illustrated the monthly payment numbers P'' as disposed in an inner row and separated from the principal sum numbers S'' by a circle 14''. When interest rates all the way from zero% to 12% are to be considered, a rotor or rotary "slide" 12'' may be provided with twelve concentric lines equally spaced (instead of or in addition to providing equivalent lines on the rotatable "runner" or arm 13'); and, assuming an arm or other indicator I'' to be initially placed at random on the edge of the rotor 12'', the curved lines or graphs G'' may be drawn thereon by any suitable procedure, as by the following:

If desired, spaces may be left at 15'' and 16'', or at 17'' and 18'', or, as shown, both inner and outer spaces may be provided to receive figures indicating consecutive intervals of time, as years and months, required for the payment of principal sums and interest thereon under various stated conditions; and when the same figures are repeated in the outer spaces 15'', 16'' and in the inner spaces 17'', 18'', I may connect the respective figures referred to by graphs corresponding in function to straight-line graphs described in connection with Fig. 1. The ends of these graphs may be fixed, and their curvatures may be established with the aid of tables, such as the well-known tables of Robinson.

For example, I may set the rotary runner or arm 13″ at 1000, to use this number as a basis for the drawing of graphs suitable for use in connection with this or any other principal sum; and I may then establish on the respective parallel interest rate lines from 0 to 12 (the last being preferably given an innermost position, because little used) a series of dots relating to the completion of payment within six months. Thus, ascertaining from tables or by computation that monthly payments of 166.66 are required to repay $1000 in equal monthly payments in six months, without interest, I may, leaving the runner set opposite the mentioned sum, so turn the rotor 12″ as to bring the arrow or indicator I opposite $166.66 on the monthly payment scale P″, then making a dot at intersection of the hair line of the runner 13′ with the "zero" interest line. Similarly I may ascertain (as from Robinson) the monthly payment required in case (say) 2% interest is to be included, payment to be completed, as before, within six months; and, with the rotor 12″ and its indicator I″ moved to the new position required, and the hair line of the runner R″ kept in the position last referred to, I may make a second dot,—at the intersection of the hair line with the 2% line; and I may so proceed in the establishment of dots upon the 4% line, the 6%, the 8% line etc. Through the dots thus fixed I may draw a smooth and continuous curve (as the curve connecting the figures 6—6, Fig. 3).

The interest payable on a loan repaid in six months being comparatively little, the line referred to is not widely different from a radial line; but it will be obvious that the curves drawn in connection with successive periods or intervals of time are increasingly inclined and increasingly crowded, so that the line 12—12, relating to completion of payments or repayment within twelve years, has a very marked curvature. Curves shown in Fig. 3, and any desired number of interposed or additional curves, may be drawn in substantially the manner indicated; and all may thereafter be used in connection with computations relating to any principal sum within the range of the instrument.

The preferred mode of using an instrument of the character illustrated in Fig. 3 may be fully understood from the descriptions given in connection with preceding figures; and, although I have shown my invention as applied only to straight slide rules and to circular rules, it will of course be appreciated that the same principles may be employed in the construction of charts or cylindrical computing devices having any desired scope; and it is immaterial whether the elements to which I have referred as "fixed" be held stationary while the "slide" and "runner" are moved, or whether one of the latter be held stationary and the other two be moved, to effect a setting.

In Fig. 3, I show a curved graph or inclined line referring to each six month interval between zero and 12 years; and I indicate the elapsed time in years and months rather than in months only; whereas in the forms illustrated in Figs. 1 and 2 I include a separate graph for each month up to 48 months; and I designate all time intervals in terms of months only. But these are optional differences in detail, and are relatively immaterial to the essential inventive ideas involved.

While I have herein described alternative embodiments of my invention, it will be understood that various features thereof might be independently employed, and also that various additional modifications, whether of a flat or a cylindrical form, might be devised by those skilled in the art to which this case relates, without the slightest departure from the spirit and scope of my invention, as the same is indicated above and in the following claims.

I claim as my invention:

1. A slide rule comprising: a runner carrying a hair line; a body; and a slide,—one of these last mentioned elements being provided with scales respectively readable with reference to principal sums and with reference to periodic payments, and the other being provided with an index point and with inclined graphs representing mathematical factors and suitably disposed to indicate, upon an adjustment of said index point relatively to said first mentioned scale, and by an observation of intersecting relationships between the mentioned graphs and the said hair line and lines extending longitudinally of said runner, the total number of stated payments required to complete payment or repayment of a pricipal sum together with interest, at various rates, on unpaid balances thereof.

2. In a slide rule having a body, a member movable relatively to the body, and a second movable member: a logarithmic scale on the body and adapted to cooperate with an index on a scale on the movable member; a second logarithmic scale on said body; eye-aiding means provided by said second movable member and adapted to be set to a value on said last-mentioned scale; a set of graphs on said first movable member; and a plurality of index points, on one of said members, adapted to intersect the graphs on said first named movable member.

In testimony whereof, I have hereunto set my hand at Los Angeles California, this 3rd day of April 1925.

SMITH LEE.